United States Patent [19]

Sano et al.

[11] Patent Number: 5,200,943
[45] Date of Patent: Apr. 6, 1993

[54] METHOD AND APPARATUS FOR CONTROLLING ENCODING AND RECORDING OF MAIN INFORMATION DATA IN ACCORDANCE WITH DIFFERENT DETECTED DATA FORMATS OF THE MAIN INFORMATION DATA

[75] Inventors: Tatsushi Sano, Kanagawa; Tatsuya Inokuchi, Tokyo, both of Japan

[73] Assignee: Sony Corporation, Tokyo, Japan

[21] Appl. No.: 590,227

[22] Filed: Sep. 28, 1990

[30] Foreign Application Priority Data

Oct. 2, 1989 [JP] Japan .................. 1-257564

[51] Int. Cl.$^5$ .............................................. G11B 7/00
[52] U.S. Cl. ...................................... 369/48; 369/54; 369/59
[58] Field of Search .................... 369/50, 57, 53, 59, 369/47, 48, 54, 56, 58, 32, 49, 51, 44.26; 360/48, 49; 358/342

[56] References Cited

U.S. PATENT DOCUMENTS

| | | | |
|---|---|---|---|
| 4,736,352 | 4/1988 | Satoh et al. | 369/59 |
| 4,800,550 | 1/1989 | Yamauchi | 369/59 |
| 4,805,046 | 2/1989 | Kuroki et al. | 360/48 |
| 4,839,879 | 6/1989 | Sawada et al. | 369/54 |
| 4,893,199 | 1/1990 | Okada | 360/48 |
| 4,969,139 | 11/1990 | Azumatani et al. | 369/58 |
| 4,977,550 | 12/1990 | Furuya et al. | 369/59 |

FOREIGN PATENT DOCUMENTS

0165320A1 12/1985 European Pat. Off.
0233783A1 8/1987 European Pat. Off.

OTHER PUBLICATIONS

Patent Abstracts of Japan, vol. 13, No. 361 (P-917)(3709), Aug. 11, 1989, and JP-A-1 119 962 (Sanyo Electric Co Ltd), May 12, 1989.
Audio, vol. 71, No. 3, Mar. 1987, New York; K. Pohlmann: "Minding your P's and Q's."

*Primary Examiner*—Wayne R. Young
*Assistant Examiner*—Thang V. Tran
*Attorney, Agent, or Firm*—Philip M. Shaw, Jr.

[57] ABSTRACT

A method for generating a record information composed of a main information having a plurality of formats and a subsidiary information associated with said main information, is disclosed. A discriminative information for discriminating the formats of the main information is arrayed in a synchronizing part of the subsidiary information, and the encoding operation is controlled as a function of the discriminative information to generate the record information. The discriminative information is transmitted to an encoding system within the extent of the data format to enable encoding in accordance with the formats and under maintenance of operational synchronization.

11 Claims, 4 Drawing Sheets

METHOD AND APPARATUS FOR CONTROLLING ENCODING AND RECORDING OF MAIN INFORMATION DATA IN ACCORDANCE WITH DIFFERENT DETECTED DATA FORMATS OF THE MAIN INFORMATION DATA

BACKGROUND OF THE INVENTION AND RELATED ART STATEMENT

This invention relates to a method for generating record data and, more particularly, to a method for generating record data by encoding a main information consistent with various specifications or formats, such as those for digital audio, CD-ROM or CD-I, as prescribed on the basis of the standards for a so-called compact disc (CD).

A variety of specifications or formats, such as those for CD-ROM (compact disc-read only memory), or CD-I (compact disc-interactive), for example, are prescribed in compliance with standards for existing recording media, such as compact discs (CDs). It is in conformity to these specifications or formats that data of various specifications or formats, such as the aforementioned CD-ROM data or CD-I data, are recorded, in place of the usual digital audio data, as the main data or information which is to be recorded in compliance with the standards for the recording media, such as CDs. This allows the existing media to be used more flexibly and extensively.

FIG. 1 shows a frame format and a block format consistent with the so-called CD standards. In this figure, each block or sector consists of 98 frames of from the 1st to 98th frames, each frame being 588 times a channel clock period T or 588T and consisting of a 24T frame sync pattern part plus 3T connecting bits, a 14T sub-code part plus 3T connective bits and a 544T data part composed of audio data and parity data. The 544T data part is the EFM data (eight-to-fourteen modulated data) consisting of 12 bytes or symbols of audio data, 4 bytes or symbols of parity data, 12 bytes or symbols of audio data and 4 bytes or symbols of parity data. Hence, 24 bytes, or 12 words, of audio data are contained in each frame, since each word of audio sample data consists of 16 bits. The sub-code part is the EFM data modulated from 8-bit sub-code data, and is arrayed in one block consisting of 98 consecutive frames, with each bit constituting one of eight sub-code channels P to W. It is noted that the sub-code parts for the 1st and 2nd frames are designed as block synchronization patterns $S_0$ and $S_1$, respectively, which represent out-of-rule patterns not prescribed in the rule of eight-to-fourteen modulating, while each of the sub-code channels P to W consists of 96 bits for the 3rd to the 98th frames.

The audio data are interleaved prior to being recorded and, for reproduction, are de-interleaved to provide audio data arrayed in the chronological order. In place of these audio data, it is also possible to record so-called CD-ROM data shown for example in FIG. 2 or CD-I data shown in FIG. 3.

Thus, FIG. 2 shows the data construction corresponding to that of audio data consisting of 2352 bytes (=24 bytes×98 frames) per block in accordance with the CD standards. In FIG. 2, A, B and C stand for the data constructions for the mode 0, mode 1 and mode 2, respectively. In each of these modes, a 12-byte sync part and a 4-byte header part are provided in this order from the leading end of each block consisting of 2352 bytes. The remaining 2336 bytes are all zero data, all user data and 2048 bytes of user data and 288 bytes of subsidiary data, for the mode 0, mode 2 and mode 1, respectively. The 4-byte header part is made up of one byte each for minute, second and block as block addresses and one byte for mode indication. The 288-byte subsidiary data in mode 1 consist of 4 bytes for error detection, 8 bytes for space, 172 bytes for P parity for error correction and 104 bytes for Q parity for error correction. Data scrambling for such error correction is performed within the extent of 2340 bytes inclusive of the header part data.

FIG. 3, or on the other hand, shows the CD-I data construction of 2352 bytes for one block, wherein A and B stand for the data constructions for forms 1 and 2, respectively. In each of these forms, a 12-byte sync part and a 4-byte header are provided in this order from the leading position of each block, as in the case of the CD-ROM described above. The header part is followed by an 8-byte sub-header part within which 2-byte regions each for file, channel, sub-code and data types are provided. The following 2328 bytes are constituted, in form 1, by 2048 bytes as user data, 4 bytes for error detection, 172 bytes for P parity and 104 bytes of Q parity. This form 1 is used for recording letter data, data for binary notation, high compression video data or the like. In form 2, the 2324 bytes following the sub-header part are used as user data and the remaining 4 bytes are reserve data. This form 2 is used for recording audio or video data.

When recording the usual user data in the form of CD-ROM data, sync data, header data or the like need be annexed to the main data in accordance with the above described CD-ROM format. In the case of mode 1, an error detection code (EDC) or an error correction code (ECC) used be generated and annexed as the subsidiary data to the main data. The conventional practice is to prepare such CD-ROM data by a software technique, process the CD-ROM data by a process similar to the process used for the usual digital audio data, formulate a master disc by so-called cutting and to produce the CD-ROM as a medium by a press working process with the aid of a stamper. This process involves additional time and costs, as compared to the case of recording the usual digital audio data for CDs, since the user data must be converted into CD-ROM format data by an additional process.

More, recently a write-once type optical disc is being put into use and it has become highly probable that such write-once optical discs will be used as CD-ROMs. In this case, it takes a lot of time to prepare CD-ROM data with the aid of the software technique as mentioned above. On the other hand, when it is desired that the data format, such as digital audio data for CDs, CD-ROM data or CD-I data, be recorded selectively on the disc, it becomes necessary to prepare the data separately in advance, which involve time-consuming and expensive operations. Thus it is contemplated that the encoding operation up to conversion of the user data into CD-ROM data or CD-I data will be performed by a hardware technique. In this case, it becomes necessary to supply an information for discriminating the data formats to the hardware taking charge of the encoding operation.

OBJECT AND SUMMARY OF THE INVENTION

It is therefore an object of the present invention to provide a method for generating a record information in which, when a plurality of data formats, such as audio data, CD-ROM data or CD-I data, are provided as the main information, as in the case of the so-called CD standards, one of these data formats is discriminatively selected, and an encoding operation suited to the selected format is used for generating the record information.

In accordance with the present invention, there is provided a method for generating a record information composed of a main information having a plurality of data formats, such as digital audio, CD-ROM or CD-I in CDs, and a subsidiary information associated with said main information, comprising arraying a discriminative information for discriminating the specifications of said main information in a sync portion of said subsidiary information, and controlling an encoding operation for said main information in accordance with said discriminative information to generate the record information.

With the record information generating method of the present invention, since the discriminative information for discriminating the data formats is arrayed in a sync part of the subsidiary information which becomes unnecessary or superfluous in the course of the encoding operation, the format discriminative information may be transmitted to an encoding system at a timing and a channel similar to those for transmission of the subsidiary information, so that the encoding operation can be accomplished by a hardware technique without impairing the operational synchroneity. Hence, the record information may be obtained on substantially a real time basis and, even when data formats are switched during recording, the encoding operation may be conveniently switched to suit the selected format to produce the encoded record information.

DESCRIPTION OF PREFERRED EMBODIMENT

Figure 1:
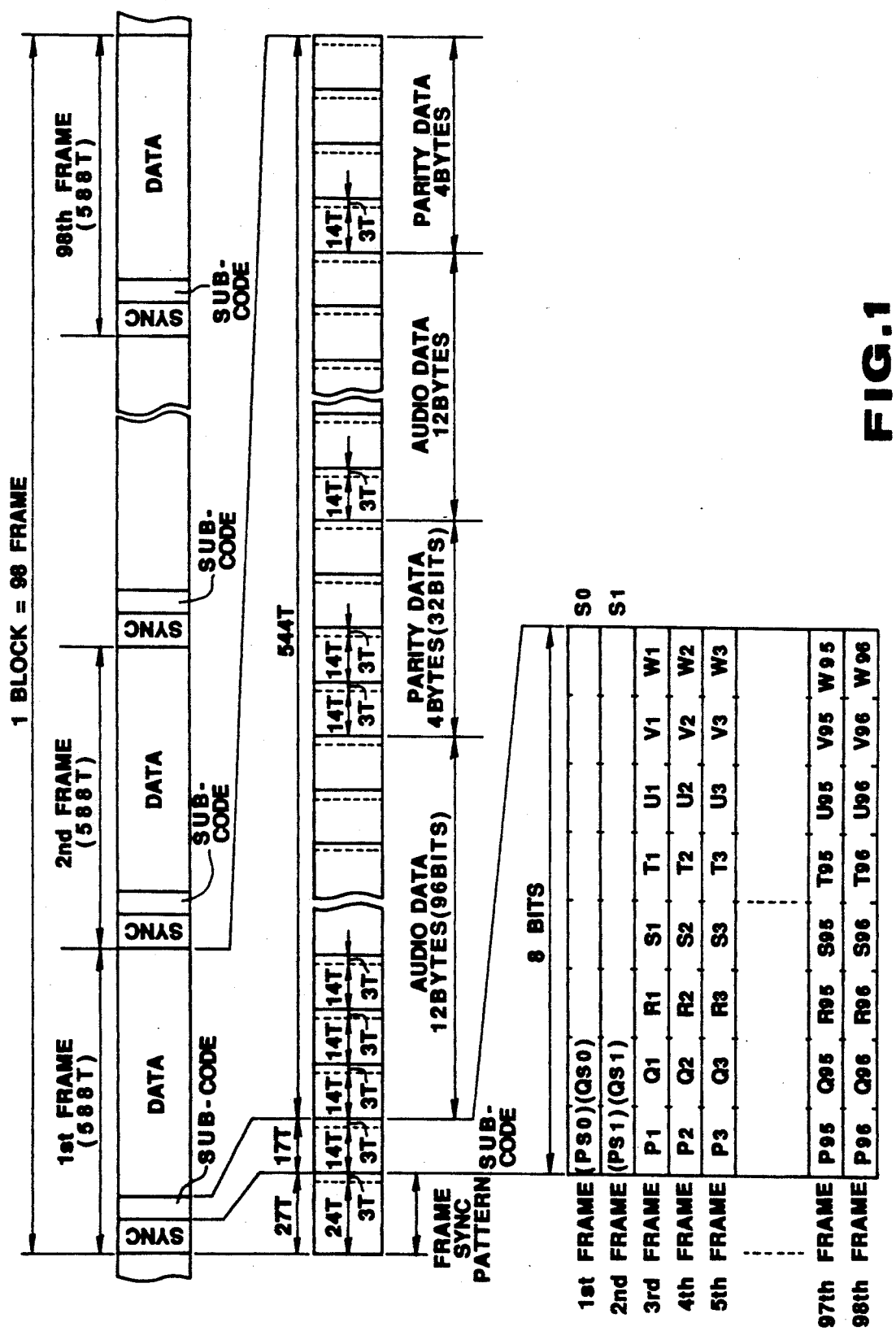
FIG. 1 shows the frame format and the block format under the so-called CD standards.

By referring to the drawings, a preferred embodiment of the present invention will be explained in detail.

Figure 4:
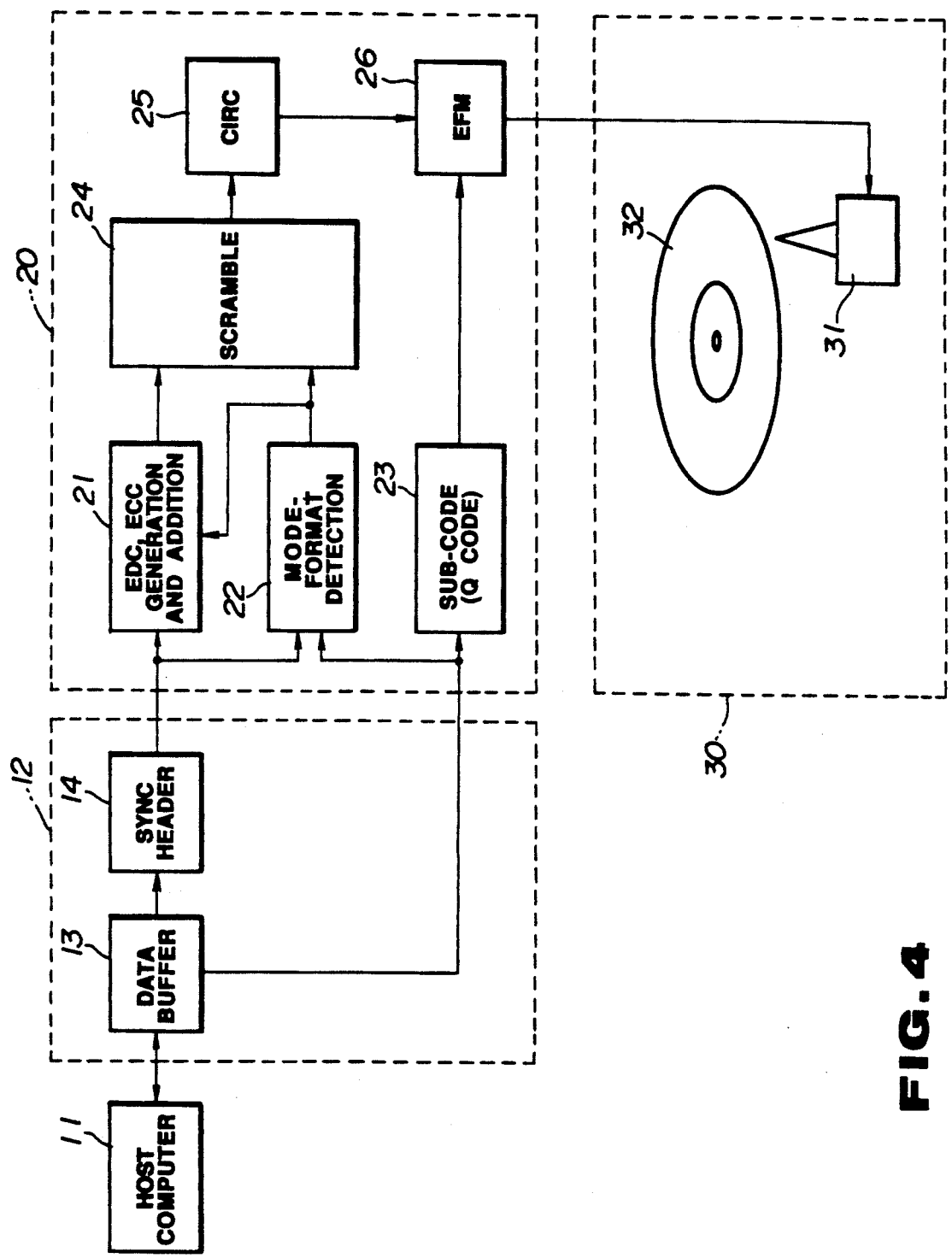
FIG. 4 is a block diagram showing the overall recording system for practicing the method for generating record signals according to the present invention.

FIG. 4 shows, in a block view, a typical construction of a recording system for practicing the method of the present invention.

In this figure, user data to be written on a compact disc and a subsidiary information, referred to as cue sheet information, as shown in the following Table 1, are transmitted from a host computer 11 comprised of a workstation or the like, to an input section 12 of an encoding system, over an SCSI bus.

TABLE 1

| control addresses | track numbers | data index | form | ALL ZERO | absolute time MIN | SEC | frame |
|---|---|---|---|---|---|---|---|
| 0100 1 | 00 | 00 | 04 | 00 | 00 | ① | 00 |
| 0100 1 | 01 | 01 | 05 | 00 | 00 | 02 | 00 |
| 0100 1 | 01 | 02 | 05 | 00 | 02 | 51 | 71 |
| 0000 1 | 02 | 00 | 00 | 00 | 11 | 01 | 32 |
| 0000 1 | 02 | 01 | 00 | 00 | 11 | 03 | 00 |
| 0000 1 | 03 | 01 | 00 | 00 | 25 | 42 | 26 |
| 0100 1 | 04 | 00 | 05 | 00 | 30 | 21 | 05 |
| 0100 1 | 04 | 01 | 05 | 00 | 30 | 24 | 05 |

TABLE 1-continued

| control addresses | track numbers | data index | form | ALL ZERO | absolute time MIN | SEC | frame |
|---|---|---|---|---|---|---|---|
| 0100 1 | 05 | 00 | 06 | 00 | 41 | 50 | 13 |
| 0100 1 | 05 | 01 | 06 | 00 | 41 | 53 | 50 |
| 0100 1 | AA | ② | 04 | 00 | 52 | 10 | 09 |

In the above Table, the numbers are given in hexadecimal notation, except those of control addresses; ① surrounded by a circle denotes the disc type and ② surrounded by a circle denotes any arbitrary value.

The above Table 1 mainly shows the usual information provided in a sub-code channel Q for a CD. The data form is the 1-byte information provided for discriminating the modes or the formats of the data to be recorded, and are defined as shown for example in the following Table 2.

TABLE 2

| | |
|---|---|
| 0 0 H | music (1 sub-coding frame = 2352 bytes |
| 0 4 H | mode 0 for CD-ROM; data all zero (sub-coding frame = 2048 bytes) |
| 0 5 H | mode 1 for CD-ROM; data scrambling with addition of ECC (1 sub-coding frame = 2048 bytes) |
| 0 6 H | mode 2 for CD-ROM; CD-I (with ECC added); data scrambling without addition of ECC (1 sub-coding frame = 2336 bytes) |
| 0 A H | CD-I (without ECC addition); ECC added for form 1 only; data scrambling (1 sub-coding frame = 2336 bytes) |

Figure 2:
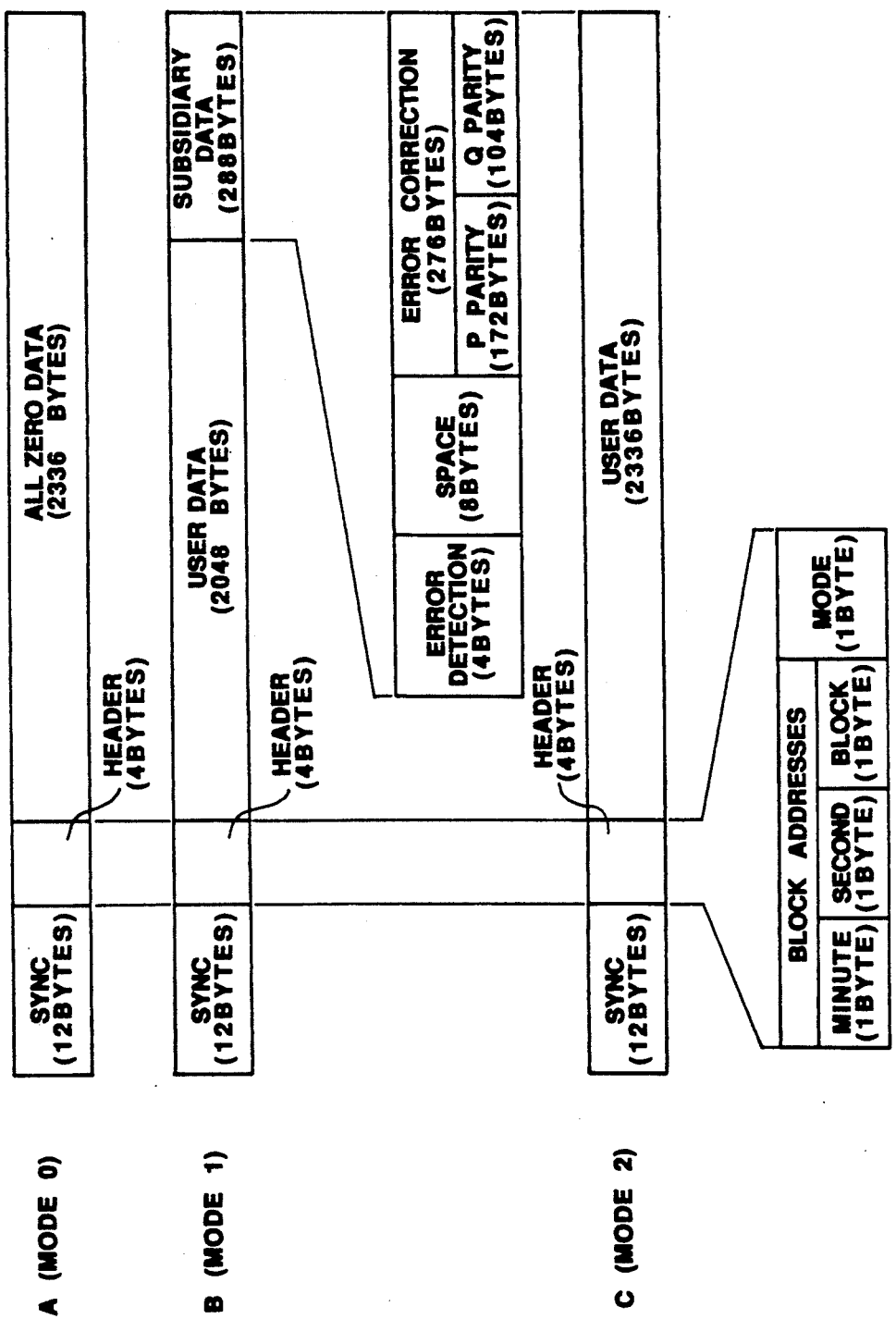
FIG. 2 shows the data construction for the CD-ROM.
Figure 3:
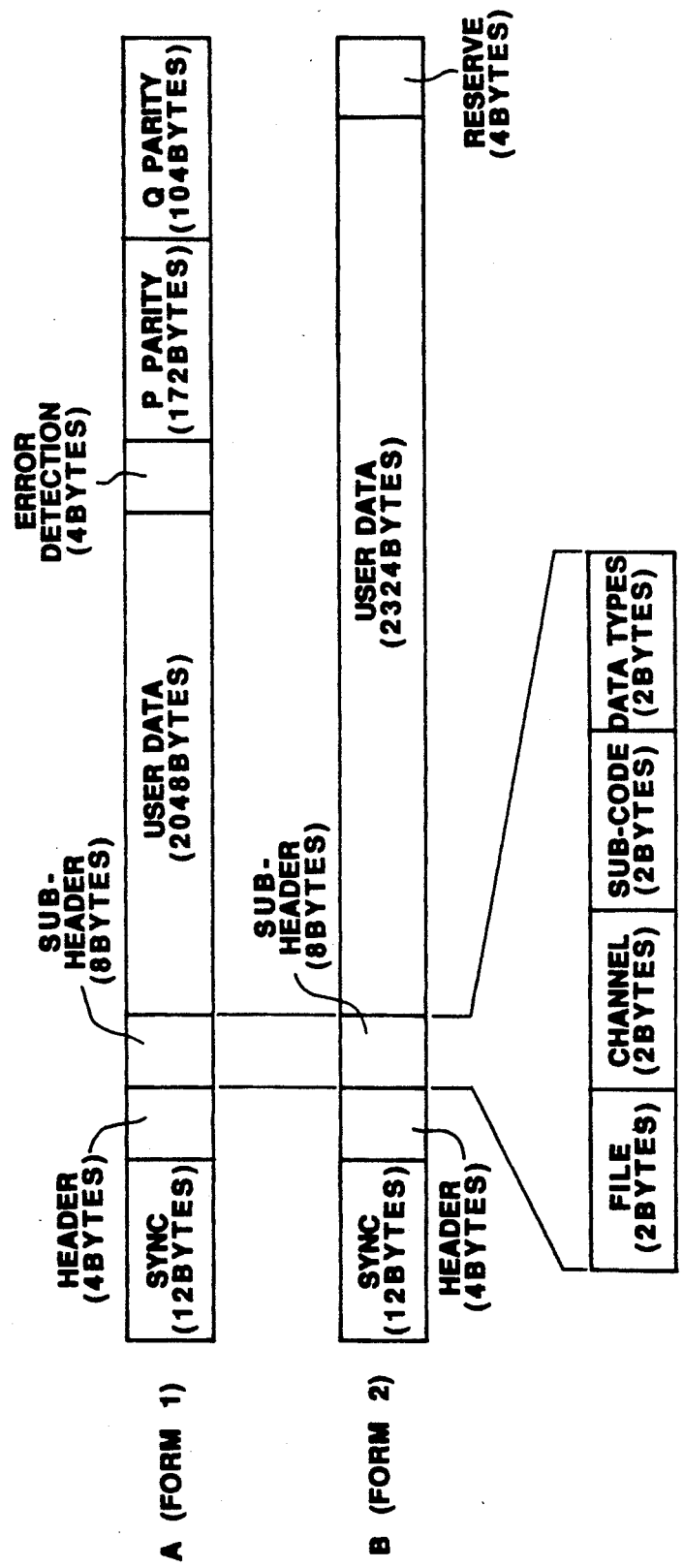
FIG. 3 shows the data construction for the CD-I.

It is noted that the sub-header of CD-I shown in FIG. 3 is to be added previously. In the case of the CD-I without addition of ECC, data to be entered are expanded to the size of the CD-ROM mode 2. At this time, the ECC and the CRC of form 1 and the reserve part of form 2 may take any arbitrary values. The frame in Table 1 and the sub-coding frame in Table 2 correspond to one block in FIG. 2 and are 98 times the frame of FIG. 2 (the frame at the time of CIRC encoding).

The cue sheet information including such data formats for discrimination as to whether the main data is the usual CD digital audio, CD-ROM or CD-I, and a data form information, such as modes, and the aforementioned user data, are transmitted to a sync header addition section 14, by way of a data buffer section 13 of an input section 12 of an encoding system shown in FIG. 1. In operation, data are outputted with block synchronization at the data buffer section 13. The 12-byte sync part or the 4-byte header part shown in FIGS. 2 and 3 are annexed at a sync header annexing section 14 to the output data of the data buffer section 13, before the data are supplied to an EDC-ECC generation-addition circuit 21 of an encoder circuit section 20. Although a software technique may be used in the input section 12 of the encoding system, a hardware designing is preferably resorted to for constructing the encoding circuit 20.

It is noted that, among the data outputted from data buffer 13 with block synchronization, the four bits of the block sync part of the sub-code channels P and Q corresponding to the block sync patterns $S_0$ and $S_1$ of FIG. 1, that is the four bits $P_{S0}$, $P_{S1}$, $Q_{S0}$ and $Q_{S1}$ of FIG. 1, carry information for discriminating the data formats, that is, information for discriminating if the main data on the disc is the usual CD digital audio data, CD-ROM data or CD-I data. In the present embodiment, the sync patterns $P_{S0}$, $Q_{S0}$ are used for affording definitions drawn in the following Table 3.

TABLE 3

| $P_{SO}$ | $Q_{SO}$ | specifications |
|---|---|---|
| 0 | 0 | usual CD (digital audio) |
| 0 | 1 | CD-ROM |
| 1 | 0 | CD-I |
| 1 | 1 | indefinite (CD-I) |

The sync patterns $S_0$, $S_1$, provided in the sub-code parts of the first and second frames, are annexed at the time of the EFM which will be explained subsequently. In the preceding encoding operation, considering that these sync patterns represent void space or superfluous parts bearing no information, and that the sub-codes are synchronized with the main data or information, the above mentioned format discriminating information is transmitted as part of the sub-code information from the data buffer section 13 to the encoder circuit section 20 during the periods of the sub-code sync patterns $S_0$, $S_1$. This sub-code information is also supplied to a mode-format detection circuit 22 and to a sub-code generator 23 of the encoding circuit section 20.

In the EDC-ECC generation and addition circuit 21 of the encoding circuit 20, the error detection code (EDC) and the error correction code (ECC) are generated and annexed to the data from the sync header addition section 14, and the resulting data are supplied to a scrambling circuit 24. It is to be noted that the data from the sync header addition section 14 are the aforementioned data shown in FIGS. 2 and 3, and the 1-byte mode information is contained in the 4-byte header part of the data. This mode information is supplied to the mode-format detection circuit 22 of the encoding circuit section 20. The aforementioned format discriminating information is contained as a part of the sub-code information from the data buffer section 13 and supplied to the mode-format detection circuit 22 of the encoding circuit section 20. Thus, in the mode-format detection circuit 22, the modes and the specifications of the data to be recorded can be discriminated. The results of discrimination are transmitted to the EDC-ECC generation and addition circuit 21 and to the scrambling circuit 24 for performing an encoding operation in accordance with the format shown in FIGS. 2 and 3.

When input data are recorded as CD-ROM mode 1 data, both the EDC and the ECC are annexed to the main data and data scrambling is performed. For mode 2, only data scrambling is performed without annexing the EDC or the ECC. For digital audio (music), none of these operations, that is, addition of EDC or ECC or data scrambling, is performed. These formats and mode may occasionally be switched even in the course of recording on one and the same medium. Thus, for example, in the above Table 1, the data form is changed from 04H (corresponding to CD-ROM mode 0 or so-called lead-in) through 05H (CD-ROM mode 1), 00H (music or digital audio) 05H (CD-ROM mode 1), 06H (CD-ROM mode 2 or CD-I in which ECC is previously annexed to main data) to 04H (corresponding to CD-ROM mode 0 or so-called lead-out) and, since the sub-code is synchronized with the main data, the encoding operation is switched in a controlled manner on a real time basis with switching of the main data.

The output data from the scrambling circuit 24 are equivalent to digital musical data on the usual CD and are subjected to various encoding operations in accordance with the usual CD standards. Thus the output data from the scrambling circuit 24 are transmitted to a cross-interleave Reed Solomon code (CIRC) circuit 25 and thence to an EFM unit 26 where the data are subjected to eight-to-fourteen modulation (EFM) and sync patterns or sub-codes shown in FIG. 2 are annexed to the modulated data to produce actual recording signals, i.e. the cutting signals, which are supplied to a recording unit 30. It is noted that the sub-code signals are supplied from the sub-code generating circuit 23 and data shown in Table 1 are arranged and recorded mainly on the sub-code channel Q.

The recording unit 30 in the present embodiment is assumed to be a so-called write once type optical disc recording apparatus, although it may be a so-called cutting machine. That is, the recording signals are transmitted to a recording laser light source 31, the recording laser light from which is irradiated on a write-once type optical disc 32, such as a pit, phase change or film deformation type disc, for producing irreversible physical or chemical changes to effect desired signal recording. This recording is more suited to small lot production than the conventional recording on CDs with the use of a cutting machine on a stamper and may be tailored to various needs on the part of users. It is to be noted however that the recording by the conventional cutting machine may be applied, or the encoder system may be used for testing a disc recording system or a disc reproducing system.

With the above described embodiment of the present invention, the information for discriminating the formats or modes is arranged in a cue sheet, such as the data form information shown in Table 1, and is transmitted from the host computer 11 to the encoding system. Thus the format discriminating information is introduced, at the data buffer section 13 of the input section 12, into a void space of the sub-code synchronized with the main data or into the sub-code channels P or Q of the sync pattern period as the superfluous period, and thence supplied to the encoding circuit 20. It becomes possible in this manner to perform the real-time encoding operation by hardware designing under synchronization with the main data. Above all, when the formats or modes are switched during recording the switching of the encoding operation may be controlled by the sub-codes synchronized with the main data, so that a synchronized operation is assured. Since it is unnecessary to prepare the CD-ROM data in advance by software technique, the CD-ROM, for example, may be produced with the expenses and during the time periods comparable to those when producing usual CDs. The present method may be applied to the write-once optical disc to reduce further the time involved in preparation, while it may also be applied to prepare CD-ROMs on the small-lot multiple-species basis to suit to variegated applications.

The present invention may also be applied to such a case in which the generated record information is used for testing disc recording devices or disc reproducing devices.

What is claimed is:

1. A method for generating record information composed of data blocks of a predetermined number of bytes of data, each data block having a leading end and including main information encoded in one of a plurality of formats and subsidiary information associated with the main information, the subsidiary information having a synchronizing part and being located at the leading end of each data block, the method comprising the steps of:
- providing the main information;
- providing the subsidiary information;
- providing discriminative information, the discriminative information defining the one of a plurality of formats that the main information is in;
- arraying the discriminative information in the synchronizing part of the subsidiary information; and
- encoding the main information in accordance with the discriminative information.

2. The method according to claim 1 wherein the subsidiary information is sub-code information synchronized with the main information.

3. The method according to claim 2 wherein the discriminative information is located in an otherwise void space in the sub-code information.

4. The method according to claim 2 wherein the sub-code information includes a superfluous period and the discriminative information is located in the superfluous period of the sub-code information.

5. The method according to claim 4 wherein the synchronizing part is a sync pattern period having sub-code channels P and Q and the superfluous period is included in the sub-code channels P and Q.

6. An optical disc recording system for recording on an optical disk record information composed of a data block of a predetermined number of bytes of data which include main information having a plurality of formats and a subsidiary information associated with the main information, the subsidiary information having a synchronizing part located at a leading end of each data block, wherein the system comprises:
- an input section for annexing to the main information and a subsidiary information associated with the main information, a header part and a synchronizing part, which includes a discriminative information for discriminating various formats of the main information, to thereby produce corresponding output signals;
- an encoding circuit section for encoding output signals supplied from the input section on the basis of the discriminative information to thereby generate the record information; and
- a recording device supplied with the record information from the encoding circuit section to effect recording of the record information on a recordable optical disc.

7. The optical disc recording system according to claim 6 wherein the encoding circuit section includes
- EDC-ECC generation-addition means for generating an error detection code (EDC) and an error correction code (ECC) and annexing the EDC and ECC to the output signals from the input section to produce output signals with added EDC and ECC;
- scrambling means for scrambling the output signals with added EDC and ECC; and
- mode-format detection means for controlling the EDC-ECC generating-addition means and a scrambling operation by the scrambling means.

8. The optical disc recording system according to claim 6 wherein the input section includes
- data buffer means for outputting the main information and the subsidiary information with synchronization on a block-by-block basis; and
- sync header annexing means for annexing the synchronization part to the output signals from the data buffer means.

9. The optical disc recording system according to claim 8 wherein the discriminative information is annexed at the data buffer means to the subsidiary information.

10. The optical disc recording system according to claim 6 wherein the input section includes
- data buffer means for outputting the main information and the subsidiary information with synchronization on a block-by-block basis; and
- sync header annexing means for annexing the header part to the output signals from the data buffer means.

11. The optical disc recording system according to claim 10 wherein the discriminative information is annexed at the data buffer means to the subsidiary information.

* * * * *